United States Patent [19]

Burns

[11] Patent Number: 4,949,676
[45] Date of Patent: Aug. 21, 1990

[54] LIVESTOCK FEEDER APPARATUS

[76] Inventor: Danny Burns, Rt. 3, Maryville, Mo. 64468

[21] Appl. No.: 256,743

[22] Filed: Oct. 12, 1988

[51] Int. Cl.$^5$ .............................................. A01K 5/01
[52] U.S. Cl. .................................. 119/52.1; 119/52.4
[58] Field of Search ............. 119/52 R, 61, 63, 52 FS, 119/51 R, 52.1, 52.4

[56] References Cited

U.S. PATENT DOCUMENTS

| | | | |
|---|---|---|---|
| 471,868 | 3/1892 | Leech | 119/63 |
| 1,046,943 | 12/1912 | Barth | 119/63 |
| 1,810,782 | 6/1931 | Morris | 119/63 |
| 3,033,164 | 5/1962 | Evers | 119/52 R |
| 3,180,319 | 4/1965 | France et al. | 119/61 |

FOREIGN PATENT DOCUMENTS

| | | | |
|---|---|---|---|
| 2158285 | 5/1973 | Fed. Rep. of Germany | 119/52 R |
| 2565462 | 12/1985 | France | 119/52 R |
| 1422954 | 1/1976 | United Kingdom | 119/52 R |

OTHER PUBLICATIONS

Shenandoah Advertisement for Chromized Steel Hogh Feeders.
Osborne Industries, Inc., Brochure for Osborne Feeders.
WLC Company, Inc., Brochure for Stainless Steel Hogh Feeding Equipment.
Ideal Advertisement for Stainless Steel Confinement Feeders.
Brower Advertisement for Lo-Boy E-Z Dust.
Modern Hog Concepts Advertisement for Round Hole Stainless Steel Feeders.
Schouten Feeders Inc., Advertisement for the Feed Save.
Marting Mfg. Inc., Brochure for Smidley Nursery Feeders.

Primary Examiner—John Weiss
Attorney, Agent, or Firm—Hovey, Williams, Timmons & Collins

[57] ABSTRACT

A pig feeder includes a hopper in which a supply of feed is stored, and a feed trough mounted adjacent a lower end of the hopper and in communication with the hopper through an opening therein so that feed in the hopper can pass into the feed trough. The trough includes a bottom wall, a front wall extending upwardly from the bottom wall and having a top edge, and a top face having a width extending between the top edge of the front wall and the hopper. The top face has at least one feeding hole therethrough which is substantially U-shaped having a curved portion and a straight portion, the curved portion of the feeding hole being remote from the hopper. The diameter of the curved portion is preferably equal to the height of the front wall so that pigs feeding from the trough must reach vertically downwardly to get to the feed.

2 Claims, 1 Drawing Sheet

LIVESTOCK FEEDER APPARATUS

BACKGROUND OF THE INVENTION

1. Field of the Invention

The present invention relates generally to livestock feeding devices and, more particularly, to a pig feeder having a hopper for storing feed and a trough in communication with the hopper for permitting pigs to reach the feed.

2. Description of the Prior Art

The science of raising pigs has become highly developed since the days when pigs roamed free in mud filled yards eating slop fed to them in open troughs. Today, it is common to see pigs raised in very clean confinement units having separate pens for pigs of similar sizes. These separate pens are employed to segregate pigs by size so that different feed formulas may be fed to different sized pigs thus enabling the farmer to bring the pigs to market size much more quickly than has been possible in the past.

A concern in the design of feeders used with modern day confinement units is to conserve feed by attempting to prevent feeding pigs from rooting or raking feed from the troughs and onto the ground surrounding the feeder. This concern is especially important where the floors of a unit are grated or otherwise incapable of containing feed that falls from the feeder such that feed falling from the feeder is wasted by passing beneath the floor out of reach of the feeding pigs.

In order to conserve as much feed as possible, and in light of the fact that pigs in confinement units are frequently segregated by size, feeders provided in each of the units of a conventional hog confinement structure are commonly customized for the size of pig to be confined therein. For example, a known feeder construction has a hopper communicating with a trough through an adjustable slot in the hopper, and the trough is provided with a top cover having circular openings through which pigs may feed. When a feeder of this construction is employed in a unit in which pigs of less than sixty pounds are to be confined, the feeder may be provided with a cover having openings which are smaller in diameter than a similarly constructed feeder in a unit for use with pigs nearing market size.

In addition to allowing feeding by pigs of a predetermined size, the circular holes are intended to serve the purpose of preventing feed from being rooted up out of the trough during feeding. The premise on which the circular hole design is based, is that by surrounding the head of the pig as it enters the trough, none of the feed therein will escape through the hole during feeding and the pig will not be able to push the feed to the end of the feeder and up out of the trough. However, several problems have been encountered in troughs of this known construction. For example, if the pigs in a given confinement unit are not moved at the proper time to a unit adapted to enclose larger pigs, they will outgrow the feeder in the unit and will develop sores around their ears by attempting to get to the feed through the now undersized holes in the trough. Thus, the holes restrict the feeder to use only with pigs of a narrow size range.

Further, even when the feeder openings are of the proper size, pigs feeding from the trough are able to work feed therefrom by raking the feed up along the underside of their chins and out the lower part of the opening. It would be desirable to provide a feeder which overcomes these problems encountered with feeders provided with circular holes and which prevents feed from being rooted from the feeder trough by feeding pigs.

OBJECTS AND SUMMARY OF THE INVENTION

An object of the present invention is to provide a feeder which is constructed in such a way that pigs of a broad range of sizes may feed therefrom without being able to root feed from the trough.

In addition, it is another object of the present invention to provide a feeder which forces pigs to feed by reaching more vertically downwardly into the feed trough than in past constructions in order to protect against raking of the feed up and out of openings provided therein.

Yet another object of the invention is to provide a feeder that includes no relatively movable parts and which permits the use of a constant width feed hopper opening for dispensing feed to the troughs of the device. A disadvantage of known devices employing adjustable slots exists in that the parts become rusted or worn during brief exposure to the confinement unit environment, resulting in the feeder not working properly. By providing a feeder with no movable parts, this shortcoming in the known feeders may be overcome.

According to the present invention, the livestock feeding apparatus includes a feed trough having a bottom wall, a front wall extending upwardly from the bottom wall and having a top edge, and a top face having a width extending between the top edge of the front wall and the hopper. The top face has at least one feeding hole therethrough which is substantially U-shaped having a curved portion and a straight portion, the curved portion being adjacent the top edge of the front wall. In addition, a hopper for storing a supply of feed may be provided in communication with the trough through a slot in the hopper. The front wall of the trough extends upwardly from the bottom wall at a constant height which is substantially equal to the diameter of the curved portion of the feeding hole.

By this construction, pigs feeding from the trough are forced to reach essentially vertically downwardly into the trough and are unable to rake feed out of the holes or to root the feed along the length of the trough. Further, by providing U-shaped holes in the top face of the trough, a broader range of pig sizes is accommodated by any given hole size, resulting in less of a possibility that pigs will develop sores on their ears by outgrowing the feeder.

BRIEF DESCRIPTION OF THE DRAWING FIGURES

The inventive feeder will be described below with reference to the attached drawing figures in which.

DETAILED DESCRIPTION OF THE PREFERRED EMBODIMENTS

Figure 1:
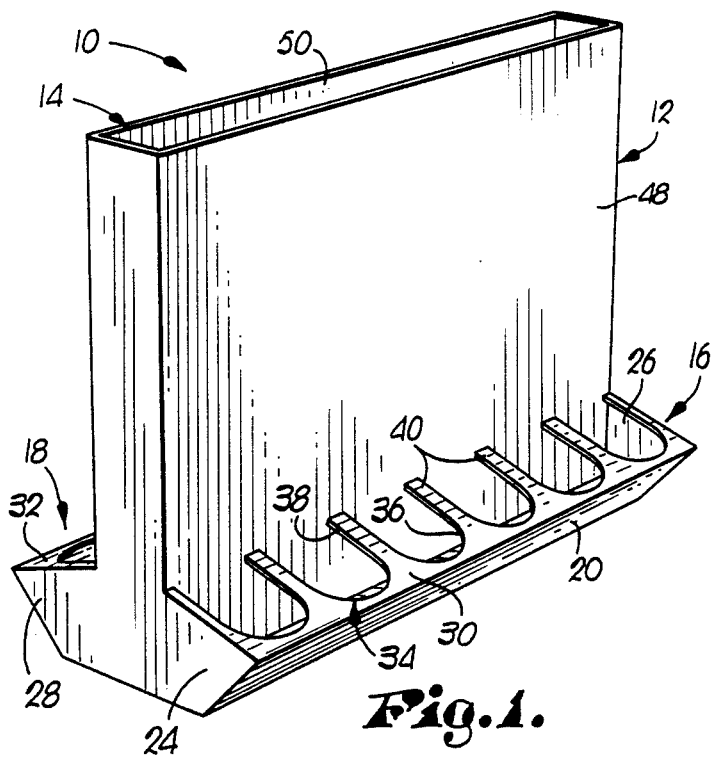
FIG. 1 is a perspective view of a pig feeder constructed in accordance with the invention.

As shown in FIG. 1, a preferred embodiment of the inventive pig feeder designated generally as 10 includes a vertically extending hopper 12 having a generally rectangular shape and an open top 14. The hopper 12 is not limited to a rectangular shape but may also be constructed as a cylindrical hopper without departing from the invention.

Near the bottom of the hopper, a pair of troughs 16, 18 are provided, each of which extends along a side of the hopper 12 and includes a front wall 20, 22, a pair of end walls 24, 26, 28, and a top wall 30, 32 presenting a number of feeding openings 34. These feeding openings 34 are U-shaped having a curved edge portion 36 adjacent the front wall 20, 22 of the trough 16, 18 and a straight edge portion 38 abutting the hopper 12. Legs 40 are defined in the top wall 30, 32 between the openings 34, which serve to prevent pigs from rooting feed along the length of the trough 16, 18 and into large piles which may tend to overflow onto the floor surrounding the feeder 10.

Figure 3:
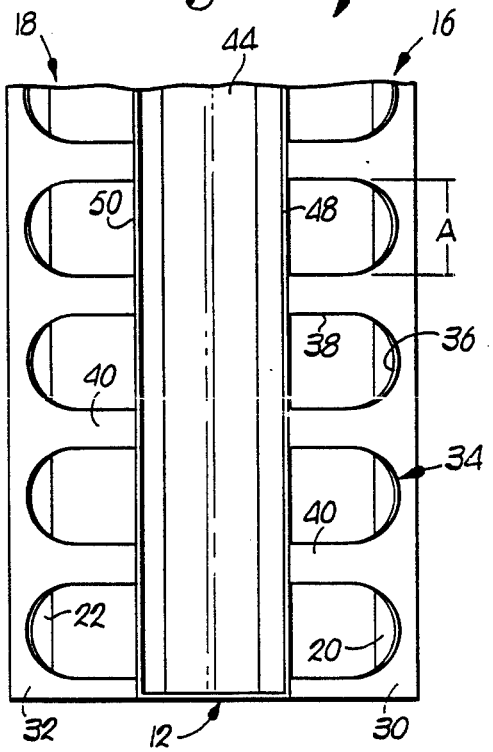
FIG. 3 is a plan view, partially cut away, of the inventive feeder.

The U-shaped configuration of each of the feeding openings 34, as illustrated in FIG. 3, serves two important functions in the inventive construction. First, because the openings 34 include the curved lower edge portion 36 adjacent the front wall 20, 22 of the feeder which may be designed to closely match the shape of the chin or throat of pigs feeding therefrom, feed is prevented from escaping around the sides or base of the pig's chin or throat. In addition should it be necessary that pigs remain in a confinement unit having a feeder designed for use with smaller pigs, there is little or no danger that the pigs will develop sores around their ears from attempting to enter the openings as can occur with feeders having circular openings, since the straight edge portions 38 of the U-shaped openings 34 extend toward the hopper 12 and permit larger pigs to feed from the openings 34.

Figure 2:
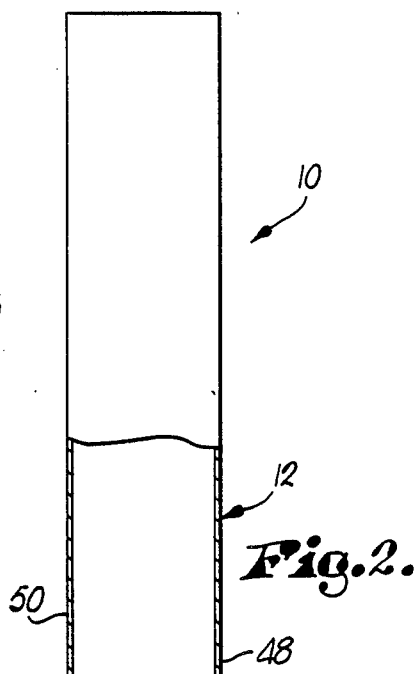
FIG. 2 is an end sectional view of a first feeder design in accordance with the invention.

From FIG. 2, it can be seen that feed is delivered to the trough 16, 18 of the feeder 10 through a slot 42 at the bottom of the hopper 12. This slot 42 has a constant width of, e.g. one inch which restricts the amount of feed which can pass from the hopper 12 into the trough 16, 18. Although it is possible to make the width of the slot 42 adjustable, it is not preferred since the inventive construction permits a reliable dispensing of feed to the trough without a need for adjustment of the slot 42 or of moving parts of any kind. In addition to providing the slots 42 to restrict the flow of feed into the troughs 16, 18, an inverted V-shaped ridge 44 is provided which extends along the bottom of the hopper 12 between the opposing troughs 16, 18 so as to direct feed toward the slots 42 as it falls toward the bottom of the hopper 12. In this manner, even feed that is high in fat, which is somewhat sticky, is able to flow down through the hopper to a position in or adjacent the troughs 16, 18 which is within reach of feeding pigs.

Each trough 16, 18 is defined by the front wall 20, 22 extending upwardly from the bottom of the feeder, and the top wall 30, 32 extending between the top edge of the front wall and a side surface 48, 50 of the hopper 12. In accordance with the invention, the dimensions of the openings 34, the front wall 20, 22 and the top wall 30, 32 are fashioned to present the openings 34 at a predetermined angle and height above the bottom of the trough 16, 18 which, forces a feeding pig to reach downwardly to the feed over a distance sufficient to prevent the raking of feed from the trough. Specifically, the curved edge portion 36 of each opening 34 has a diameter A which is equal to the height of the front wall 20, 22 of the trough, and the top wall 30, 32 has a width B which is two inches larger than the diameter A of the opening 34. In addition, the top wall 30, 32 is fastened to the hopper 12 at a height C above the bottom of the feeder, which height C is one inch greater than the diameter A of the opening 34.

Thus a ratio is defined between the diameter A of the openings 34, the height A of the front walls 20, 22, the width B of the top walls 30, 32, and the height C at which the top walls are fastened to the hopper 12. This ratio may be expressed as the dimension A being one inch smaller than the dimension C and two inches smaller than the dimension B. The ratio may vary to a small degree so long as the openings 34 are presented at a height and angle sufficient to require a pig to reach sufficiently downward to the feed trough through the U-shaped openings 34 that the pig will be unable to rake feed the entire height of the side of the trough to the openings 34.

Figure 4:
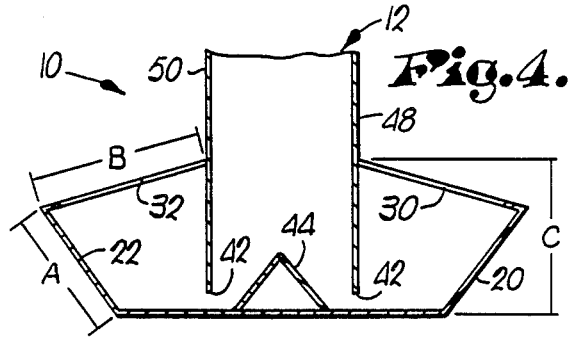
FIG. 4 is an end sectional view of a second feeder design in accordance with the invention.
Figure 5:
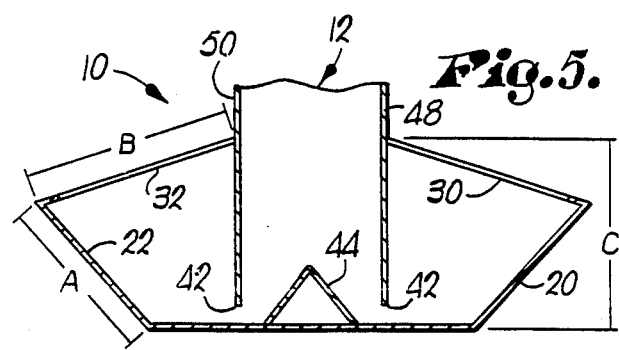
FIG. 5 is an end sectional view of yet another feeder design in accordance with the invention.

As an example of how the ratio may find application in a series of feeders, a first feeder constructed for pigs of less than 60 pounds, such as is illustrated in FIG. 2, may include openings 34 having a curved edge portion 36 with a diameter A of five inches (shown in FIG. 3), front walls 20, 22 each having a height A of five inches equal to the diameter of the openings 34, and top walls 30, 32 each having a width of seven inches and being connected to the sides 48, 50 of the hopper 12 six inches above the bottom of the feeder. In a second feeder, to be used with pigs ranging from 60 to 150 pounds, the openings 34 are formed with a diameter A of seven inches, the front walls 20, 22 have a height A of seven inches, and the top walls 30, 32 have a width of nine inches and are connected to the sides 48, 50 of the hopper eight inches above the bottom of the feeder. FIG. 4 illustrates the manner in which the dimensions of the troughs 16, 18 change when the troughs are customized to accommodate pigs from 60 to 150 pounds.

Where the pigs to be feeding from the feeder are greater than 150 pounds, the troughs 16, 18 may again be customized as illustrated in FIG. 5. In this third construction, the openings 34 have a diameter of nine inches, the front walls 20, 22 have a height of nine inches, and the top walls 30, 32 have a width of eleven inches and are connected to the side of the hopper 12 ten inches above the feeder bottom.

When combined with the U-shaped construction of the openings, this trough arrangement insures that feed will not be easily rooted from the trough and secures the conservation of feed. In addition, by constructing the feeder in accordance with this invention, feeder openings are presented at a height and angle which make it difficult for feed to be raked up from the bottom of the trough, and the U-shape of the openings prevents any feed that does reach the openings from escaping the trough. In addition, as pigs outgrow the openings in the feeder, the unique U-shaped design allows the pigs to continue to feed from the feeder without developing sores on their heads as occurs in the circular openings of conventional feeders.

Although the invention has been described with reference to the preferred embodiment illustrated in the drawing, it is understood that modifications and substitutes may be made, and equivalents employed herein, without departing from the invention as set forth in the claims.

What is claimed is:

1. A livestock feeding apparatus comprising:

a hopper for storing a supply of feed, said hopper having upper and lower ends, and including an opening adjacent the lower end; and a feed trough mounted adjacent the lower end of the hopper and being in communication with the hopper through the opening so that feed in the hopper can pass into the feed trough from the hopper, the feed trough including: a bottom wall, a front wall extending upwardly from the bottom wall and having a top edge, and a top face having a lower edge connected to the top edge of the front wall and an upper edge connected to the hopper, the top face having at least one feeding hole therethrough which is substantially U-shaped having a curved portion and a straight portion, the curved portion of the feeding hole being remote from the hopper, the diameter of the curved portion being substantially equal to the distance along the front wall between the bottom wall and the top edge of the front wall, and being approximately 2 inches smaller than the width of the top face between the top edge of the front wall and the hopper and approximately 1 inch smaller than the height of the upper edge of the top face above the bottom wall.

2. A livestock feeding apparatus comprising:

a hopper for storing a supply of feed, said hopper having upper and lower ends and including an opening adjacent the lower end;

a feed trough mounted adjacent the lower end of the hopper and being in communication with the hopper through the opening so that feed in the hopper can pass into the feed trough from the hopper, the feed trough including: a bottom wall, a front wall extending upwardly from the bottom wall and having a top edge and a substantially constant height, and;

a top face having a width extending between the top edge of the front wall and the hopper, the top face having at least one feeding hole therethrough which is substantially U-shaped having a curved portion and a straight portion, the curved portion of the feeding hole being remote from the hopper and including a diameter that is substantially equal to the height of the front wall and is approximately 2 inches smaller than the width of the top face between the top edge of the front wall and the hopper.

* * * * *